(No Model.)
J. & R. BEAN.
WAGON WHEEL.
No. 265,480. Patented Oct. 3, 1882.
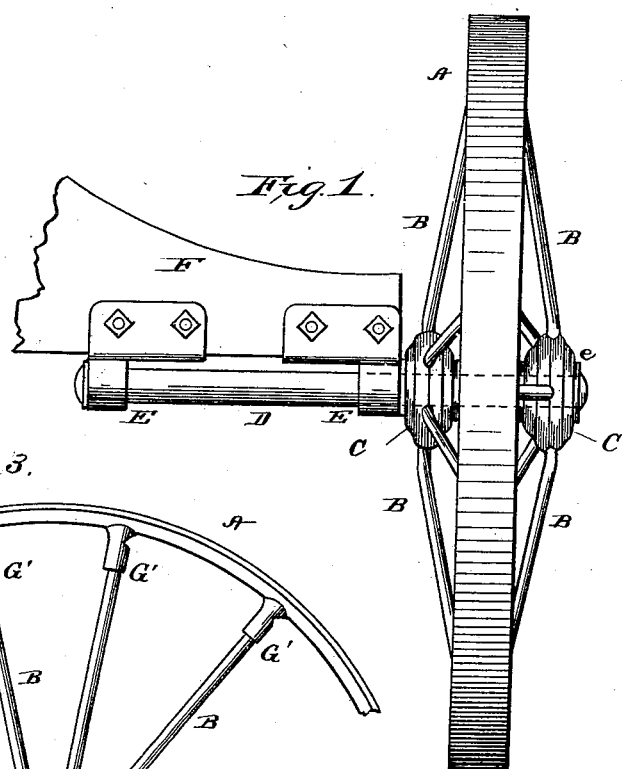
Witnesses.
Edwin L. Yewell.
H. Aubrey Toulmin.
Inventor.
John Bean and Roscoe Bean
By C. M. Alexander,
their Atty.

United States Patent Office.

JOHN BEAN AND ROSCOE BEAN, OF SPRINGFIELD, OHIO, ASSIGNORS TO THE TRICYCLE MANUFACTURING COMPANY, OF SAME PLACE.

WAGON-WHEEL.

SPECIFICATION forming part of Letters Patent No. 265,480, dated October 3, 1882.

Application filed December 14, 1881. (No model.)

*To all whom it may concern:*

Be it known that we, JOHN BEAN and ROSCOE BEAN, of Springfield, in the county of Clarke, and in the State of Ohio, have invented certain new and useful Improvements in Wagon-Wheels; and we do hereby declare that the following is a full, clear, and exact description thereof, reference being had to the accompanying drawings, and to the letters of reference marked thereon, making a part of this specification.

This invention relates to wheels which are made of metal, and especially designed for boys' wagons, but which may be used for other purposes; and the nature of our invention consists of a wheel having a metal rim, radial spokes, two hubs, and novel means for compressing the hubs, so that the spokes are caused to tighten the entire wheel.

The invention also consists in constructing each one of the hubs of a wheel of two parts secured together by rivets in the manner hereinafter explained.

The invention further consists in split socket-pieces adapted to the rim of the wheel, and also to the hubs thereof, which socket-pieces are closed firmly on the ends of the spokes, so as to retain them in their places, and said socket-pieces are also notched, so as to allow the extreme ends of the spokes to be swaged or headed when desired. These, together with other features, will be fully set forth in the following description.

In the annexed drawings, Figure 1 is an elevation of a wheel, its short axle, the boxes therefor, and a portion of a bolster. Fig. 2 is a vertical cross-section of the bolster and a divided box for the axle. Fig. 3 is a side or face view of part of a wheel having solid hubs and split sockets to receive the spokes. Fig. 4 is a section in detail, showing one of the hubs of the wheel of Fig. 1. Fig. 5 is a vertical cross-section of part of a wheel, showing the hubs held by a compressing-bolt. Fig. 6 is a cross-section of the rim of a wheel, showing a socket-piece not split to receive the outer end of a spoke having a tenon passed entirely through the rim. A modification of this would be to have the said tenon enter part way into the rim. Fig. 7 shows one of our split socket-pieces notched before it is compressed on the end of a spoke. Fig. 8 is a view showing the socket-piece closed on the end of a spoke and the extremity of the latter swaged or headed.

A designates the metallic rim or felly of a wheel, which may or may not be provided with a tire.

B B designate the radial spokes, and C C are the two hubs which are represented in Fig. 1 as applied on one end of a short axle, D. This axle is supported in boxes E E, each one of which may be made of one piece or of two vertically-divided halves, as shown in Fig. 2, and secured to the bolster F by means of bolts or otherwise. We represent two axle-boxes in Fig. 1; but it is obvious that a single long box might be substituted. To prevent the axle from slipping out of the box or boxes a nut may be put on the inner end of the axle; but we prefer to put a washer near the end of the axle and rivet or spread the extremity thereof.

Instead of the nut or the washer and rivet, a hole may be drilled through the axle at the inner end of either box and a pin driven into the hole.

It will be seen by reference to Fig. 1 that the boxes E sustain and afford bearings for the axle, one near the inner extremity thereof and the other in close relation to the inner hub. We thus secure the axle and its wheel against lateral or wabbling motion.

Each one of the hubs C of Figs. 1 and 4 is formed of two vertically-divided parts, $b$ $b'$. The part $b$ is constructed with a tubular extension, $c$, which is passed through the center of the part $b'$ and riveted at $e$. The circumferential edge $e'$ of the part $b$ is reduced and swaged over the corresponding edge of the part $b'$. This feature is represented in Fig. 4.

If desired, the two parts $b$ $b'$ may be held together by rivets passed through them between those ends of the spokes which are recessed into the hub.

The outer ends of the spokes of the wheel may be adjusted directly into holes made partly through the rim A, or, if desired, the outer ends of the spokes may be fitted into socket-pieces G, having shoulders and tenons on them, which latter may be fitted into the rim A, as shown in Fig. 6.

In Figs. 3, 5, 7, and 8 we have represented what we denominate "split socket-pieces" G', which are used for the inner and outer ends of the spokes, or which may be used for either the inner ends of the spokes or the outer ends thereof. When the sockets G' are used for the inner ends of the spokes they are cast with the hubs, and after the spokes are adjusted in their places the lips of the sockets G' are firmly closed around the spokes by a suitable machine. The extremities of the spokes may be spread or swaged, the ends thus enlarged being received by notches $f$, thus rigidly holding the ends of the spokes in place. When the outer ends of the spokes are secured to the split sockets G' these may be applied to the rim of the wheel in the same manner as we have described for securing the sockets G to the rim.

Fig. 5 shows two hubs, which we construct with ears through which bolts $g$ are passed, and provided with nuts on their ends, by means of which the two hubs can be forcibly drawn toward each other, thereby tightening the entire wheel. Hubs thus held together may be applied to turn around the axle; or they may be secured on the axle by means of keys $h$ inserted into grooves formed in the hubs and axle, as shown in Fig. 4.

Instead of keys, the axle may be enlarged by riveting or upsetting it in any suitable manner to prevent the hubs from spreading.

A very important feature of our invention above set forth is having compressible hubs, to which the spokes are attached, secured on one end of a short axle which is firmly supported by boxes arranged only on one side of the wheel.

We are aware that split tubular spoke-sockets are not *per se*, broadly speaking, new, as the same have heretofore been constructed in combination with a hub or sleeve; and we therefore disclaim such a device, when combined as above indicated, as our invention; but What we do claim, and desire to secure by Letters Patent, is—

1. The combination of the hub constructed of two parts, $b\ b'$, and riveted together at $e\ e'$, substantially as described.

2. The combination of two adjustable bisected hubs, means for preventing these hubs from spreading, spokes secured to the hubs and rim of the wheel, and the short axle for the hubs, substantially as described.

In testimony whereof I affix my signature, in presence of two witnesses, this 12th day of December, 1881.

JOHN BEAN.

Witnesses:
 WM. R. HOMER,
 W. H. WELLAND.

In testimony whereof I affix my signature, in presence of two witnesses, this 14th day of December, 1881.

ROSCOE BEAN.

Witnesses:
 J. J. MCCARTHY,
 H. AUBREY TOULMIN.